(12) United States Patent
Yu et al.

(10) Patent No.: US 10,284,786 B2
(45) Date of Patent: May 7, 2019

(54) METHOD FOR IMPROVING IMAGE EFFECT AND APPARATUS THEREOF

(71) Applicant: SHENZHEN CHUANGWEI-RGB ELECTRONIC CO., LTD, Shenzhen (CN)

(72) Inventors: Minghuo Yu, Shenzhen (CN); Wenxing Yao, Shenzhen (CN); Xiaodong Yang, Shenzhen (CN); Jian Yang, Shenzhen (CN)

(73) Assignee: SHENZHEN CHUANGWEI-RGB ELECTRONIC CO., LTD, Shenzhen (CN)

(*) Notice: Subject to any disclaimer, the term of this patent is extended or adjusted under 35 U.S.C. 154(b) by 0 days.

(21) Appl. No.: 15/759,924

(22) PCT Filed: Jan. 13, 2017

(86) PCT No.: PCT/CN2017/071020
§ 371 (c)(1),
(2) Date: Mar. 14, 2018

(87) PCT Pub. No.: WO2018/028150
PCT Pub. Date: Feb. 15, 2018

(65) Prior Publication Data
US 2018/0255225 A1    Sep. 6, 2018

(30) Foreign Application Priority Data

Aug. 12, 2016    (CN) .......................... 2016 1 0660644

(51) Int. Cl.
H04N 7/01        (2006.01)
H04N 5/235       (2006.01)
(Continued)

(52) U.S. Cl.
CPC ........... *H04N 5/2355* (2013.01); *G06T 5/007* (2013.01); *G09G 3/3406* (2013.01); *G09G 5/10* (2013.01);
(Continued)

(58) Field of Classification Search
CPC ........ H04N 5/2355; H04N 9/68; H04N 5/202; H04N 9/646; H04N 7/0125; H04N 5/21;
(Continued)

(56) References Cited

U.S. PATENT DOCUMENTS

2015/0003749 A1* 1/2015 Kim .................... H04N 19/463
                                                      382/232
2015/0245043 A1* 8/2015 Greenebaum .......... H04N 19/98
                                                     375/240.25
(Continued)

FOREIGN PATENT DOCUMENTS

CN        101460917 A    6/2009
CN        102098830 A    6/2011
(Continued)

OTHER PUBLICATIONS

The World Intellectual Property Organization (WIPO) International Search Report for PCT/CN2017/071020, dated May 25, 2017 5 Pages.

*Primary Examiner* — Jefferey F Harold
*Assistant Examiner* — Humam M Satti
(74) *Attorney, Agent, or Firm* — Anova Law Group, PLLC

(57) ABSTRACT

Disclosed are method for improving image effect and apparatus thereof, comprising: when a system starts up, acquiring a screen parameter to determine whether an input signal source is an SDR film source or an HDR film source; if it is an SDR film source, performing first image processing to obtain an SDR image, starting up HDR conversion mode;
(Continued)

reducing its backlight brightness to pre-set brightness, and displaying current peak brightness pixel or area according to a screen parameter after increasing backlight brightness; if it is HDR film source, performing second image processing to obtain HDR image, closing down HDR conversion mode, before displaying. Thus, a high-grayscale detail performance capacity is improved, achieving an SDR-to-HDR function, a higher brightness range, more picture details, an SDR film source can be played in an HDR television with the display effect of an HDR film source.

17 Claims, 2 Drawing Sheets

(51) Int. Cl.
*H04N 5/202* (2006.01)
*H04N 9/64* (2006.01)
*G06T 5/00* (2006.01)
*H04N 9/68* (2006.01)
*G09G 5/10* (2006.01)
*G09G 3/34* (2006.01)
*H04N 5/21* (2006.01)
*G09G 3/20* (2006.01)

(52) U.S. Cl.
CPC ............ *H04N 5/202* (2013.01); *H04N 7/0125* (2013.01); *H04N 9/646* (2013.01); *H04N 9/68* (2013.01); *G09G 3/2096* (2013.01); *G09G 3/3413* (2013.01); *G09G 3/3426* (2013.01); *G09G 2320/0271* (2013.01); *G09G 2320/0613* (2013.01); *G09G 2320/0646* (2013.01); *G09G 2360/16* (2013.01); *H04N 5/21* (2013.01)

(58) Field of Classification Search
CPC .................. G09G 3/3406; G09G 5/10; G09G 2320/0271; G09G 2360/16; G09G 3/3426; G09G 3/3413; G09G 3/2096; G09G 2320/0646; G09G 2320/0613; G06T 5/007
See application file for complete search history.

(56) References Cited

U.S. PATENT DOCUMENTS

2018/0096466 A1* 4/2018 Eto ........................... G06T 5/00
2018/0115761 A1* 4/2018 Shimada ................ G11B 20/10

FOREIGN PATENT DOCUMENTS

| CN | 104115490 A | 10/2014 |
| CN | 105321487 A | 2/2016 |
| CN | 105575342 A | 5/2016 |
| CN | 106210921 A | 12/2016 |
| EP | 3051487 A1 | 8/2016 |
| WO | 2015130796 A1 | 9/2015 |

* cited by examiner

METHOD FOR IMPROVING IMAGE EFFECT AND APPARATUS THEREOF

CROSS-REFERENCES TO RELATED APPLICATIONS

This application is a national stage application of PCT Patent Application No. PCT/CN2017/071020, filed on 13 Jan. 2017, which claims priority to Chinese Patent Application No. 201610660644.2, filed on 12 Aug. 2016, the content of all of which is incorporated herein by reference.

FIELD OF THE INVENTION

The present invention relates to the field of display processing technologies, and more particularly, to a method for improving an image effect and an apparatus thereof.

BACKGROUND

Since 2015, after a plurality of products including a PC game, a digital camera and more have gradually started to support an HDR technology, the HDR technology has gradually become a very popular technology in a television technology field. Using the HDR technology may increase a detail performance of a picture, and improve a picture quality. Following a 2nd Flat Panel Display Technology Development Forum and HDR Technology Summit being held, a television industry has drafted and decided an HDR television standard for the television industry, which means the HDR technology will become an important display technology for a next generation TV set, and every major TV manufacturer has also developed and popularized an HDR TV product.

HDR is an image with a high dynamic range, which is a concept of a plurality of fields including photography and video production; it may improve effectively a brightness range of an image, and enrich a colorfulness of the image, which is mainly applied to a 4K ultrahigh definition TV (UHD TV). In order to achieve a display effect of HDR, there is a special requirement on a film source, that is, the film source must be an HDR film source. Currently, a TV with an HDR function processes an HDR film source and a non-HDR film source in a different way: for an HDR film source, it adopts a picture quality improvement technology according to the HDR, while for an SDR film source, it still adopts a picture quality procession technology in the prior art. If it adopts the picture quality improvement technology according to the HDR film source for an SDR film source, there will be a plurality of problems including a color cast and more. Therefore, there will be no HDR effect displayed, when playing a 4K SDR film source on a TV set with the HDR function, making the HDR function of an HDR TV no way to show up. Further, in the current market, there are very few HDR film sources, and quite a few SDR film sources. Playing an SDR film source on an HDR TV set will definitely affect the display effect of HDR.

Therefore, the current technology needs to be improved and developed.

BRIEF SUMMARY OF THE DISCLOSURE

According to the above described defects, the purpose of the present invention is providing a method for improving an image effect and an apparatus thereof, in order to reduce a plurality of problems in the prior art that when a HDR TV is playing an SDR film source, there is no way to display the HDR effect.

In order to achieve the above mentioned goals, the technical solution of the present invention to solve the technical problems is as follows:

A method for improving an image effect, wherein comprising a plurality of following steps:

when a system starts up, acquiring a screen parameter to determine whether an input signal source is an SDR film source or an HDR film source;

if the input signal source is an SDR film source, performing first image processing on the SDR film source to obtain an SDR image, and starting up an HDR conversion mode;

reducing a backlight brightness of the SDR image to a pre-set brightness, and displaying a current peak brightness pixel or a peak brightness zone according to the screen parameter after a backlight brightness is increased; and if the input signal source is an HDR film source, performing second image processing on the HDR film source to obtain an HDR image, and displaying the HDR image after closing down the HDR conversion mode.

The method for improving the image effect, wherein the screen parameter comprising each zone parameter of a divided screen, and a brightness improvement percentage adapting to a maximum brightness of the screen, the screen parameter is pre-stored in a register accordingly.

The method for improving the image effect, wherein the step of determining whether the input signal source is an SDR film source or an HDR film source, comprising specifically:

decoding the input signal source, before checking if there is a head file and an according value, if there is, then the input signal source is determined to be an HDR film source, if there is no, then the input signal source is determined to be an SDR film source.

The method for improving the image effect, wherein the step of performing first image processing on the SDR film source to obtain an SDR image, comprising specifically:

decoding the SDR film source, performing a GAMMA process, a color enhancement, a noise reduction process to the image after decoding, before obtaining the SDR image.

The method for improving the image effect, wherein the step of starting up an HDR conversion mode, comprising specifically: controlling a first group of IO ports output a mode enable signal, a second group of IO ports output a function enable signal, a third group of IO ports output a dimming enable signal.

The method for improving the image effect, wherein the step of displaying a current peak brightness pixel or a peak brightness zone according to the screen parameter after a backlight brightness is increased, comprising specifically:

according to a brightness signal of each pixel in the SDR image, extracting the peak brightness pixel or the peak brightness zone in a whole picture;

according to the zone parameter, recognizing a plurality of local areas of the divided screen according to the peak brightness pixel or the peak brightness area;

increasing the backlight brightness for the peak brightness pixel or the peak brightness zone in the local areas according to the brightness improvement percentage obtained.

The method for improving the image effect, wherein each pixel comprising four sub-pixels of red, green, blue and white.

The method for improving the image effect, wherein the step of performing second image processing on the HDR film source to obtain an HDR image, comprising specifically: decoding the HDR film source, performing a GAMMA fixation process to the image after decoding, mapping the image after the GAMMA fixation and the brightness information of the screen, before obtaining the HDR image.

The method for improving the image effect, wherein the step of closing down the HDR conversion mode, comprising specifically: controlling a first group of IO ports output a mode disable signal, a second group of IO ports output a function disable signal, a third group of IO ports output a dimming disable signal.

The present invention further discloses an apparatus for improving an image effect, applied to achieving the method for improving the image effect, connecting to a displayer, wherein comprising a main chip, a signal board, a T-CON board and a constant current drive circuit;

when a system starts up, the main chip acquires the screen parameter to determine whether an input signal source is an SDR film source or an HDR film source; if the input signal source is an SDR film source, the main chip performs first image processing on the SDR film source to obtain an SDR image, and controls the T-CON board start up an HDR conversion mode through the signal board; the T-CON board controls the constant current drive circuit reduce the backlight brightness of the SDR image to the pre-set brightness, and transfer a current peak brightness pixel or a peak brightness zone to the displayer for display, after the backlight brightness is increased according to the screen parameter; and if the input signal source is an HDR film source, the main chip performs second image processing on the HDR film source to obtain an HDR image, and controls the T-CON board close down the HDR conversion mode through the signal board; the T-CON board controls the constant current drive circuit transfer the HDR image to the displayer for display.

Comparing to the prior art, the present invention provides a method for improving an image effect and an apparatus thereof, when a system starts up, acquiring a screen parameter to determine whether an input signal source is an SDR film source or an HDR film source; if the input signal source is an SDR film source, performing first image processing on the SDR source so as to obtain an SDR image, and starting up an HDR conversion mode; reducing the backlight brightness of the SDR image to a pre-set brightness, and displaying a current peak brightness pixel or a peak brightness zone according to the screen parameter after the backlight brightness is increased; and if the input signal source is an HDR film source, performing second image processing on the HDR film source so as to obtain an HDR image, closing down the HDR conversion mode, and then displaying the HDR image. In this way, a high-grayscale detail performance capacity is improved, an SDR-to-HDR function is achieved, and there is a higher brightness range and there are more picture details, so that an SDR film source can be played with the display effect of an HDR film source in an HDR television.

DETAILED DESCRIPTION OF EMBODIMENTS

The present invention provides a method for improving an image effect and an apparatus thereof, which mainly solves a problem of a display effect of an SDR film source, through optimizing a detail performance capacity of a low-grayscale and a high-grayscale, an SDR-to-HDR function is achieved, so as to make an SDR film source be able to be played with the display effect of an HDR film source in an HDR television, which greatly improves a user adhesion to an HDR featured TV. In order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 1:
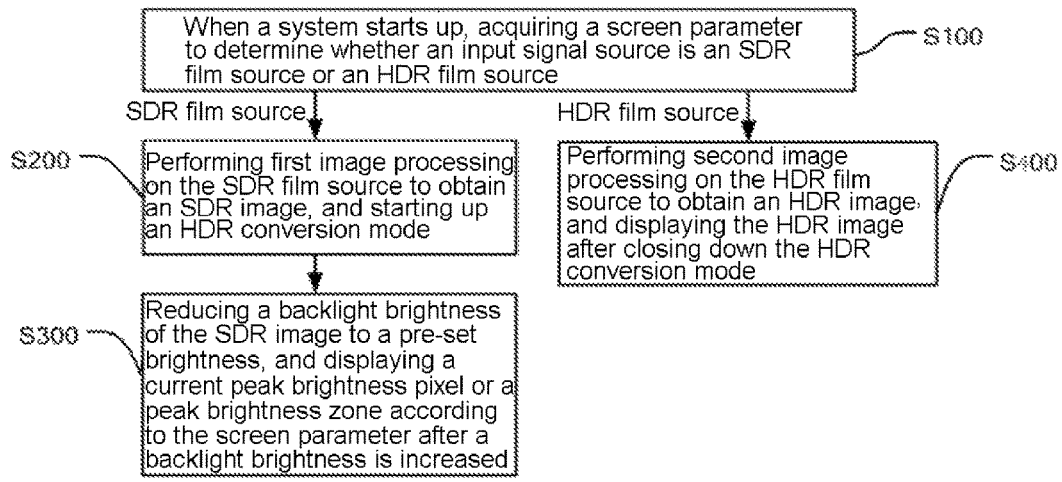
FIG. 1 illustrates a flow chart on a method for improving an image effect provided in the present invention.

The method for improving the image effect provided in the present invention is mainly directed to the SDR film source, achieving the SDR-to-HDR function through an apparatus for improving the image effect in a TV set (preferably an HDR featured TV set). Referencing to FIG. 1, the method for improving the image effect comprises a plurality of following steps:

S100, when a system starts up, acquiring a screen parameter to determine whether an input signal source is an SDR film source or an HDR film source; if the input signal source is an SDR film source, performing a step S200, if the input signal source is an HDR film source, performing a step S400;

S200, performing first image processing on the SDR film source to obtain an SDR image, and starting up an HDR conversion mode;

S300, reducing a backlight brightness of the SDR image to a pre-set brightness, and displaying a current peak brightness pixel or a peak brightness zone according to the screen parameter after a backlight brightness is increased;

S400, performing second image processing on the HDR film source to obtain an HDR image, and displaying the HDR image after closing down the HDR conversion mode.

In the step S100, when a TV set system starts up, it first acquires a screen parameter. The screen parameter comprises each zone parameter of a divided screen, and a brightness improvement percentage adapting to a maximum brightness of the screen. The zone parameter means how many areas the screen may be divided at a horizontal direction and a vertical direction. A number of the areas relates to a size of the screen and a local dimming drive ability. A larger size increases the number of the areas, if fewer areas are divided, then each zone will be larger, that may appear a problem of a peak zone adjustment being not exact enough.

The present embodiment arranges a zone register which is preset according to the size of the screen and the local dimming drive ability. An address 0X7B3 of the zone register stores a number of the zones divided horizontally, and an address 0X7B4 of the zone register stores a number of the zones divided vertically, a total number of the zones is a product of the address 0X7B3 of the zone register and the address 0X7B4 of the zone register. For example, for a TV set of 55 inches with a 4K resolution, an according value in the address 0X7B3 of the register is 0X20, and an according value in the address 0X7B4 of the register is 0X12 (Hex.), a number of the zones divided by a local dimming is H(32)*V(18), H(32) represents there are 32 zones divided in a horizontal direction, and V(18) represents there are 18 zones divided in a vertical direction, which corresponds to a displayer with a resolution of 3840*2160. H(32)*V(18) corresponds to a following table 1.

TABLE 1

| Name of the register | Address of the register | Value stored in the register |
| --- | --- | --- |
| Horizontal zone | 0X7B3 | 0X20 |
| Vertical zone | 0X7B4 | 0X12 |

The value stored in the register has a different value for a TV set having a different resolution and a different size. Thus even if a displayer is changed, the system may still obtain the number of zones divided through recognizing the size of the displayer.

The brightness improvement percentage adapting to the maximum brightness of the screen is also stored in a corresponding register (an EEPROM in the T-CON board is applied as the register). Since the maximum brightness of different screens is different, the corresponding brightness improvement percentage is set according to the maximum brightness (used in the step S300). As shown in a following table 2, the addresses are 0X786 and 0X787, wherein when the value in 0X787 is 00, and the value in 0X786 is 08, then the brightness is 50% of the maximum brightness in a whole picture. When the value in 0X787 is 99, and the value in 0X786 is 09, then the brightness is 60% of the maximum brightness in a whole picture. When the value in 0X787 is 33, and the value in 0X786 is 0 B, then the brightness is 70% of the maximum brightness in a whole picture. When the value in 0X787 is CC, and the value in 0X786 is 0 C, then the brightness is 80% of the maximum brightness in a whole picture. When the value in 0X787 is 66, and the value in 0X786 is 0 E, then the brightness is 90% of the maximum brightness in a whole picture. When the value in 0X787 is 00, and the value in 0X786 is 10, then the brightness is 100% of the maximum brightness in a whole picture.

TABLE 2

| | | Gain curve | | | | | |
| --- | --- | --- | --- | --- | --- | --- | --- |
| Name | Address | Type: 50% | Type: 60% | Type: 70% | Type: 80% | Type: 90% | Type: 100% |
| Default_Gain[12:8] | 786 | 08 | 09 | 0B | 0C | 0E | 10 |
| Default_Gain[7:0] | 787 | 00 | 99 | 33 | CC | 66 | 00 |

A TV set with different maximum brightness selects a corresponding Default_Gain from the addresses of the two registers. Thus even if the displayer is changed, the system may still obtain the corresponding brightness improvement percentage through recognizing the maximum brightness of the displayer.

A total number of the zones obtained and the brightness improvement percentage may be set by a manufacturer before leaving a factory; may also be renewed by downloading the screen parameter from an official website. Obtaining once every time when the system starts, in such a way a user may renew accordingly the screen parameter after changing the displayer. Afterwards, the system may check if there is any signal sources input. If there is no signal source input, then continuing detecting the signal source. If there is a signal source input, then determines if the signal source is an SDR film source or an HDR film source.

A determination process of the system to the SDR film source and the HDR film source is as follows:

According to a feature of the current HDR film source, the HDR film source mainly comprises a head file having following three characters: a color space standard adopted by a plurality of color primaries of the HDR film source, a standard adopted by a plurality of transfer characteristics of peak brightness and a nonlinear matrix coefficient of the brightness. After decoding a film source input from a digital signal input port, if it is detected that a value of the color primaries is 9, a value of the Transfer Characteristics is 16 and a value of the matrix coefficients is 9, that represents the film source input is an HDR film source. If there is no value having the above characters detected after decoding, then it is determined as an SDR film source. Wherein the value of the color primaries is 9, that represents the color space standard is BT.2020. the value of the transfer characteristics is 16, represents the brightness standard is SMPTE ST2084. The value of the matrix coefficients is 9, represents the linear relationship of the brightness information is a standard of BT.2020NCL.

When making subsequent image processing, decoding information on both the color and the brightness of such a class of the HDR film source are processed according to a plurality of features of the standard described above. However, with an improvement of normalization and standardization of the HDR film source, there may be other features further provided, a determination condition of the present embodiment (that is, a type and a value of the head file) will increase corresponding changes, which should all belong to the scope of protection in the present embodiment.

If it is determined to be an SDR film source, then the step S200 will be performed, first performing first image processing on the SDR film source to obtain an SDR image, which comprises specifically: decoding the SDR film source by an SDR film source decoder in a decoder chip in the signal board of the TV set. A GAMMA fixation coefficient of the SDR film source is a value of 2.2, followed by processing the decoded image with a GAMMA process (brightness, contrast and other adjustment), a color enhancement and a noise reduction process, before outputting the SDR image to the T-CON board (that is, a logic board or a screen drive board) for process.

In the present embodiment, there are two control methods to start up and close down the HDR conversion mode.

Figure 2:
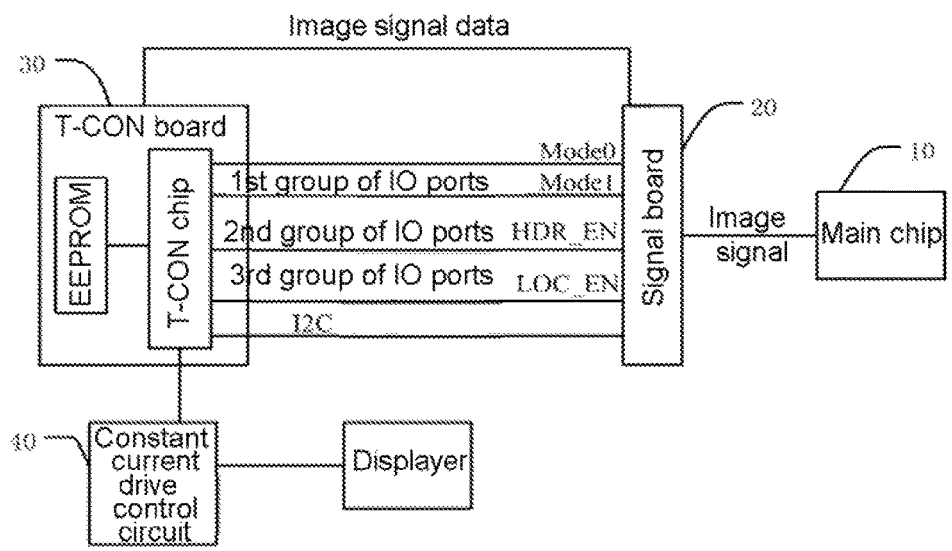
FIG. 2 illustrates a schematic diagram on an embodiment of an apparatus for improving the image effect provided in the present invention.

A first method is shown in FIG. 2, it is achieved by the T-CON board controlling the constant current drive circuit achieve a control to the constant current and backlight of the displayer. That is, the main chip makes an I2C communication with the T-CON board in the displayer through the signal board. Three IO transmission ports are arranged between the signal board and the T-CON board. A first group of IO ports is applied to control a work mode of the T-CON board, having a high Mode1 and a low Mode0 arranged. When Mode0 is 1, Mode 1 is 1, it comprises a mode enable signal, means the T-CON board enters an HDR mode. When they are other values, the T-CON board enters a non-HDR mode, such as, Mode0 is 0, Mode1 is 1; and the image is displayed with the maximum brightness, such as "00", then the maximum brightness displaying on the screen is 50% of the maximum brightness, now the screen is in a low power mode. A second group of IO ports is an HDR switch, when a signal HDR_EN is 1, it represents a function enable signal, and starts up the HDR function of the T-CON board, when the signal HDR_EN is 0, it represents a function disable signal, and closes down the HDR function of the T-CON board. A third group of IO ports is a local dimming control switch, when a signal LOC_EN is 1, it represents a dimming enable signal, and starts up the local dimming function of the T-CON board, when the signal LOC_EN is 0, it represents a dimming disable signal, and closes down the local dimming function of the T-CON board.

Figure 3:
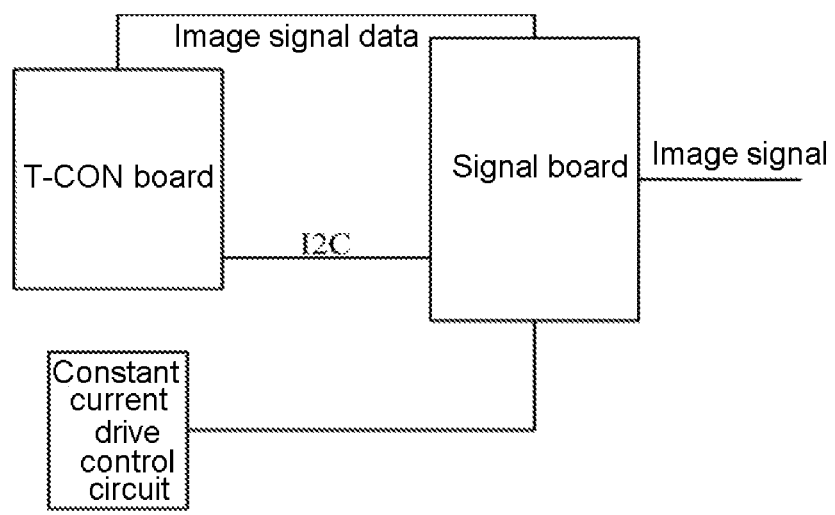
FIG. 3 illustrates a schematic diagram on another embodiment of the apparatus for improving the image effect provided in the present invention.

A second method is shown in FIG. 3, it is achieved by the main chip controlling the backlight drive control circuit and the T-CON board respectively. When inputting the SDR film source, the main chip directly controls the backlight drive control circuit execute the step S300 through the signal board. If the signal board has the function of the T-CON board integrated, then the signal board itself achieves controlling the T-CON board display.

The present embodiment adopts the first control method. When it is needed to start up the HDR conversion mode, the first group of IO ports outputs 11 (Mode0 is 1, Mode1 is 1, the T-CON board enters the HDR mode), the second group of IO ports outputs 1 (starts up the HDR function), the third group of IO ports outputs 1 (starts up the local dimming function of the T-CON board).

The TV set in the present embodiment is a TV set having the HDR function, an LED backlight source, and whose displayer adopts a RGBW display technology panel. RGB is three traditional colors of red, green, blue; RGBW adds a W (white) to an original basis, that is, red, green, blue, white. Thus in a displayer of RGBW, each pixel is composed by four sub pixels of red, green, blue, white. A low-grayscale detail performance may be improved through adopting a RGBW display technology, that is, increasing the backlight brightness of this kind of pixels may achieve the low-grayscale detail performance. The backlight drive control circuit is a constant current drive circuit, and the backlight is controlled by adopting the local dimming method. In order to reach a better effect, a preferred value of the maximum brightness of the displayer is above 500 nits. The present embodiment takes a maximum brightness of 600 nits as an example; for a better detail performance, a screen body is a 10 bit screen.

In the step S300, the backlight is controlled by the local dimming method, that is, first reducing the backlight brightness of the SDR image to a preset brightness, such as 80% of the maximum brightness, which may be achieved by controlling a size of the constant current of the constant current drive circuit, for example, if the constant current with the maximum brightness is 300 mA, then 80% of the maximum brightness corresponds to a constant current of 240 mA.

Followed by extracting the peak brightness pixel or the peak brightness zone in a whole picture, according to a brightness signal of each pixel in (each frame of) the SDR image. The image after decoding process contains brightness information, expressed in an octal, a range of the brightness information is 2 of the $8^{th}$ power, that is, 0~255. Every pixel corresponds to a value among 0~255, representing its brightness. The present embodiment calculates respectively an average of brightness information in each zone currently divided: that is, in each zone, the brightness information of all pixels is added up before divided by a total number of the pixels, and the average of brightness is achieved. Followed by comparing the average of brightness in each zone, and find a zone having a maximum average of brightness. Determining a size of the brightness information of each pixel in the zone having a maximum average of brightness, the pixel having the maximum brightness information is the peak brightness pixel, if a plurality of such pixels are adjacent to each other, then the peak brightness area is composed.

Finally, recognizing in which zone divided that the peak brightness pixel or the peak brightness area locates, obtaining the brightness improvement percentage in the zone register accordingly from the EEPROM in the T-CON board, performing a backlight brightness improvement to the peak brightness pixel or the peak brightness area in the zone according to the brightness improvement percentage, to improve a detail performance capacity of a high-grayscale zone. Afterwards, it may be output and displayed.

For example, suppose the brightness has a linear relationship with the current, and the constant current of the maximum brightness of the screen is 500 mA (a duty cycle input to the backlight drive control circuit is 100%), reducing the backlight brightness of the SDR image to 70% of the maximum brightness, which needs a constant current of 350 mA. After finding the peak brightness pixel or the peak brightness area, according to a value of CC corresponding to 0X787, and a value of 0 C corresponding to 0X786, further improving the backlight brightness of the peak brightness pixel or the peak brightness area 80% of the maximum brightness in a whole image.

If it is determined to be the HDR film source, then step S400 will be executed, first executing the second image processing to the HDR film source and achieving the HDR image, wherein, it comprising specifically: decoding the HDR film source using an HDR specialized decoder. Since the GAMMA information of the HDR film source is changing, in order to obtain a fixed GAMMA image, performing a GAMMA fixation process to the image after decoding, mapping the fixed GAMMA image and information including the screen brightness before outputting the HDR image to the T-CON board to process. In the present embodiment, the SDR film source and the HDR film source adopt different GAMMA processes.

Then it is needed to close down the HDR conversion mode, that is, the first group of IO ports output IO (Mode0 is 0, Mode1 is 1, non-HDR mode), the second group of IO ports output 0 (closing down the HDR function), the third group of IO ports output 0 (closing down the local dimming function). Now the T-CON board displays the HDR image directly with the maximum brightness. In such a state, the original HDR film source may be displayed well on the screen. The HDR film source is displayed according to the current method, due to the present embodiment adds the SDR film source, before displaying the HDR film source, an extra step of closing down the HDR conversion mode is increased, while not changing the brightness.

According to the embodiments described above, the present invention further provides an apparatus for improving the image effect, shown as FIG. 2, including a main chip 10, a signal board 20, a T-CON board 30 and a constant current drive circuit 40. When the system starts up, the main chip 10 obtains the screen parameter, determining if the signal source input is an SDR film source or an HDR film source. if the input signal source is an SDR film source, then the main chip 10 performs first image processing on the SDR film source to obtain an SDR image, and controls the T-CON board 30 start up an HDR conversion mode through the signal board 20; the T-CON board 30 controls the constant current drive circuit 40 reduce the backlight brightness of the SDR image to the pre-set brightness, and transfer a current peak brightness pixel or a peak brightness zone to the displayer for display, after the backlight brightness is increased according to the screen parameter. If the input signal source is an SDR film source, the main chip 10 performs second image processing on the HDR film source to obtain an HDR image, and controls the T-CON board 30 close down the HDR conversion mode through the signal board 20; the T-CON board 30 controls the constant current drive circuit 40 process the HDR image in the maximum brightness before transferring to the displayer for display.

All above, the present invention provides a method for improving an image effect and an apparatus thereof, when an SDR film source is displaying on an HDR TV set, for the SDR image after process, reducing the brightness of the whole picture first, then finding the peak brightness pixel or the peak brightness zone, and increasing a backlight brightness to the peak brightness pixel or the peak brightness zone, so as to improving the high-grayscale detail performance capacity. A high-grayscale detail performance capacity is improved, an SDR-to-HDR function is achieved, and there is a higher brightness range and there are more picture details, so that an SDR film source can be played with the display effect of an HDR film source in an HDR television. During a shortage of the HDR film sources, and an early stage of the HDR development, it has greatly enhanced an awareness and interest of the user to the HDR TV, expanded an application prospect of the HDR television.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A method for improving an image effect comprising:
   when a system starts up, acquiring a screen parameter to determine whether an input signal source is an SDR film source or an HDR film source;
   when the input signal source is an SDR film source, performing first image processing on the SDR film source to obtain an SDR image, and starting up an HDR conversion mode;
   reducing a backlight brightness of the SDR image to a pre-set brightness, and displaying a current peak brightness pixel or a peak brightness zone according to the screen parameter after a backlight brightness is increased; and
   when the input signal source is an HDR film source, performing second image processing on the HDR film source to obtain an HDR image, and displaying the HDR image after closing down the HDR conversion mode;
   wherein the screen parameter comprises each zone parameter of a divided screen, and a brightness improvement percentage adapting to a maximum brightness of the screen, and the screen parameter is pre-stored in a register accordingly.

2. The method according to claim 1, wherein the step of determining whether the input signal source is an SDR film source or an HDR film source, comprises:
   decoding the input signal source, before checking if there is a head file and an according value, if there is, then the input signal source is determined to be an HDR film source, if there is no, then the input signal source is determined to be an SDR film source.

3. The method according to claim 1, wherein the step of performing first image processing on the SDR film source to obtain an SDR image, comprises:
   decoding the SDR film source, performing a GAMMA process, a color enhancement, a noise reduction process to the image after decoding, before obtaining the SDR image.

4. The method according to claim 1, wherein the step of starting up an HDR conversion mode, comprises:
   controlling a first group of IO ports output a mode enable signal, a second group of IO ports output a function enable signal, a third group of IO ports output a dimming enable signal.

5. The method according to claim 1, wherein the step of displaying a current peak brightness pixel or a peak brightness zone according to the screen parameter after a backlight brightness is increased, comprises:
   according to a brightness signal of each pixel in the SDR image, extracting the peak brightness pixel or the peak brightness zone in a whole picture; according to the zone parameter, recognizing a plurality of local areas of the divided screen according to the peak brightness pixel or the peak brightness area; increasing the backlight brightness for the peak brightness pixel or the peak brightness zone in the local areas according to the brightness improvement percentage obtained.

6. The method according to claim 1, wherein each pixel comprising four sub-pixels of red, green, blue and white.

7. The method according to claim 1, wherein the step of performing second image processing on the HDR film source to obtain an HDR image, comprises:
   decoding the HDR film source, performing a GAMMA fixation process to the image after decoding, mapping the image after the GAMMA fixation and the brightness information of the screen, before obtaining the HDR image.

8. The method according to claim 1, wherein the step of closing down the HDR conversion mode, comprises:
   controlling a first group of IO ports output a mode disable signal, a second group of IO ports output a function disable signal, a third group of IO ports output a dimming disable signal.

9. An apparatus for improving an image effect, applied to achieving the method for improving the image effect according to claim 1, connecting to a displayer, comprising a main chip, a signal board, a T-CON board and a constant current drive circuit; wherein:
   when a system starts up, the main chip acquires the screen parameter to determine whether an input signal source is an SDR film source or an HDR film source;
   when the input signal source is an SDR film source, the main chip performs first image processing on the SDR film source to obtain an SDR image, and controls the T-CON board start up an HDR conversion mode through the signal board;
   the T-CON board controls the constant current drive circuit reduce the backlight brightness of the SDR image to the pre-set brightness, and transfer a current peak brightness pixel or a peak brightness zone to the displayer for display, after the backlight brightness is increased according to the screen parameter;
   when the input signal source is an HDR film source, the main chip performs second image processing on the HDR film source to obtain an HDR image, and controls the T-CON board close down the HDR conversion mode through the signal board; and
   the T-CON board controls the constant current drive circuit transfer the HDR image to the displayer for display.

10. The apparatus according to claim 9, wherein the screen parameter comprises each zone parameter of a divided screen, and a brightness improvement percentage adapting to a maximum brightness of the screen, the screen parameter is pre-stored in a register accordingly.

11. The apparatus according to claim 9, wherein the step of determining whether the input signal source is an SDR film source or an HDR film source, comprises:

decoding the input signal source, before checking if there is a head file and an according value, if there is, then the input signal source is determined to be an HDR film source, if there is no, then the input signal source is determined to be an SDR film source.

12. The apparatus according to claim 9, wherein the step of performing first image processing on the SDR film source to obtain an SDR image, comprises:

decoding the SDR film source, performing a GAMMA process, a color enhancement, a noise reduction process to the image after decoding, before obtaining the SDR image.

13. The apparatus according to claim 9, wherein the step of starting up an HDR conversion mode, comprises:

controlling a first group of IO ports output a mode enable signal, a second group of IO ports output a function enable signal, a third group of IO ports output a dimming enable signal.

14. The apparatus according to claim 10, wherein the step of displaying a current peak brightness pixel or a peak brightness zone according to the screen parameter after a backlight brightness is increased, comprises:

according to a brightness signal of each pixel in the SDR image, extracting the peak brightness pixel or the peak brightness zone in a whole picture; according to the zone parameter, recognizing a plurality of local areas of the divided screen according to the peak brightness pixel or the peak brightness area; increasing the backlight brightness for the peak brightness pixel or the peak brightness zone in the local areas according to the brightness improvement percentage obtained.

15. The apparatus according to claim 10, wherein each pixel comprising four sub-pixels of red, green, blue and white.

16. The apparatus according to claim 9, wherein the step of performing second image processing on the HDR film source to obtain an HDR image, comprises:

decoding the HDR film source, performing a GAMMA fixation process to the image after decoding, mapping the image after the GAMMA fixation and the brightness information of the screen, before obtaining the HDR image.

17. The apparatus according to claim 9, wherein the step of closing down the HDR conversion mode, comprises:

controlling a first group of IO ports output a mode disable signal, a second group of IO ports output a function disable signal, a third group of IO ports output a dimming disable signal.

* * * * *